United States Patent [19]

Brandt et al.

[11] Patent Number: 5,441,807
[45] Date of Patent: Aug. 15, 1995

[54] MULTILAYER, STRETCHED HEAT-SEALABLE POLYPROPYLENE FILM

[75] Inventors: Rainer Brandt, Walsrode; Ulrich Reiners, Neuenkirchen; Anton Krallmann; Neele Neelen, both of Fallingbostel; Jürgen Böhner, Bomlitz, all of Germany

[73] Assignee: Wolff Walsrode Aktiengesellschaft, Walsrode, Germany

[21] Appl. No.: 206,305

[22] Filed: Mar. 3, 1994

[30] Foreign Application Priority Data

Mar. 10, 1993 [DE] Germany .............. 43 07 440.5

[51] Int. Cl.⁶ .................................................. B32B 7/12
[52] U.S. Cl. ...................................... 428/349; 428/516; 428/910
[58] Field of Search .................... 428/910, 516, 349

[56] References Cited

U.S. PATENT DOCUMENTS

| | | | |
|---|---|---|---|
| 5,151,317 | 9/1992 | Bothe | 428/516 |
| 5,234,733 | 8/1993 | Schloegl et al. | 428/349 |
| 5,318,842 | 6/1994 | Ogale | 428/349 |

*Primary Examiner*—Edith Buffalow
*Attorney, Agent, or Firm*—William C. Gerstenzang; Sprung Horn Kramer & Woods

[57] ABSTRACT

The invention relates to sealable polypropylene films having an improved water vapor barrier effect through the following layer structure:

ABCBA where a) C is the base layer of highly isotactic polypropylene with an isotacticity of >94% and a hydrocarbon resin which has a molecular weight of up to about 2000 g/mol and a softening point above 130° C., b) the B's are two jacket layers of highly isotactic polypropylene (isotacticity >94%) free from hydrocarbon resin, the ratio between the thickness of the jacket layer and the thickness of the base layer being between 0.01 and 0.1, c) the A's are two surface layers of a heat-sealable polyolefin homopolymer, copolymer or terpolymer, these surface layers containing at least one antiblocking agent, a lubricant and an antistatic agent.

8 Claims, No Drawings

MULTILAYER, STRETCHED HEAT-SEALABLE POLYPROPYLENE FILM

This invention relates to a multilayer, stretched heat-sealable polypropylene film having an improved barrier effect against water vapor. The characteristic features of the film according to the invention are a base layer of highly isotactic polypropylene and hydrocarbon resin, two layers of highly isotactic polypropylene which surround the base layer and which are free from hydrocarbon resin (hereinafter referred to as jacket layers) and two heat-sealable surface layers of an olefinic copolymer or terpolymer.

The use of hydrocarbon resins for modifying polypropylene films is the subject of numerous patent applications.

EP-B 247 898 describes a polypropylene film which has improved mechanical and optical properties through the addition of hydrocarbon resin. The film in question also shows improved barrier properties against water vapor and oxygen.

EP-A 468 333 describes a polypropylene film containing hydrocarbon resin which has improved barrier properties against water vapor and oxygen coupled with improved smoothness of passage through machinery.

EP-B 217 388 describes a polypropylene film containing hydrocarbon resin which shows improved twist behavior for wrapping candies.

EP-A 479 101 also describes a resin-containing polypropylene film having improved twist properties.

EP-A 488 010 describes a resin-containing, metallizable twist-wrap film.

The improved mechanical strength of a resin-containing polypropylene film is described in EP-A 406 642.

EP-A 400 456 describes a polypropylene film containing hydrocarbon resin for shrink labeling while EP-A 489 373 describes a polypropylene film containing hydrocarbon resin which is distinguished by improved shrinkage and barrier properties.

Both in EP 247 898 and in EP 468 333, a considerable improvement in the barrier effect against water vapor (maximum 50%) is only achieved by the use of large quantities of hydrocarbon resin (10 to 40% by weight, based on the film).

However, large quantities of hydrocarbon resin lead to high global migration values. The global migration is a measure of the total quantity of particles which migrate from the film into the contents of the pack (particularly foods) during contact of the film therewith.

In addition, films containing high concentrations of hydrocarbon resin show particularly poor surface slip owing to the tackiness of hydrocarbon resins. Accordingly, the problem addressed by the present invention was to provide a film which would have good water vapor barrier properties despite a low resin content.

This problem has been solved by a film according to claim 1. Preferred features are that the base layer of polypropylene additionally contains a hydrocarbon resin in a quantity of 1 to 40% by weight and, more particularly, in a quantity of 5 to 30% by weight (both here and in the following, percentages by weight are based on the particular layer).

The base layer preferably consists of an isotactic polypropylene having a melting point of 160° C. to 170° C. which is characterized in that it has an isotacticity of greater than 94% (as measured by $^{13}$C-NMR, J. C. Randall, J. Polym. Sci.: J. Polym. Phys, Ed. 12, 703–712 (1974) and 14, 1693–1700 (1976)).

The low molecular weight hydrocarbon resin is a resin which is characterized by a softening point of >130° C. (ASTM E 28). It is known from the literature (see EP 247 898) that the incorporation of such a resin leads to improvements in water vapor barrier properties, optical properties and mechanical properties. The hydrocarbon resins may be divided into three groups, namely: petroleum resins, terpene resins, and coal tar resins. Within the group of petroleum resins, cyclopentadiene, styrene and methyl styrene resins are preferably used. The resins in question are oligomeric polymers or copolymers having molecular weights below 2000 g/mol. Since the polypropylene films are usually made colorless and transparent, the resins have to be completely hydrogenated in the presence of a catalyst. Terpene resins essentially contain oligomeric hydrogenated polymers of the monomers pinene, β-pinene and dipentene (D, L limonene) and are also used for the modification of polypropylene. Hydrogenated oligomeric cyclopentadiene resins (HOCP) having softening points of or above 130° C. are particularly suitable for improving the water vapor barrier effect of polypropylene.

The jacket layers are free from hydrocarbon resin and contain a highly isotactic polypropylene which is characterized by an isotacticity of greater than 94% (as measured by $^{13}$C-NMR, see above). The thickness of the jacket layers is in the range from 0.5 μm to 2 μm.

To guarantee smooth passage through machinery coupled with good sealing properties, additives have to be incorporated in the sealing or surface layers. Among the many materials which may be used for such layers, the following are preferred:

statistical propylene/ethylene copolymers
statistical propylene/1-butene copolymers
statistical propylene/ethylene/olefin terpolymers
mixtures of two or three of the polymers mentioned above.

A copolymer containing 90 to 99% polypropylene and 1.0 to 10% polyethylene is particularly preferred. This sealing layer material is characterized by a melting point in the range from 110° C. to 150° C. and, more particularly, in the range from 120° C. to 140° C.

Antistatic agents, lubricants and antiblocking agents are used as additives for improving smoothness of passage through machinery.

Antistatic agents are substances of which part of the molecule is hydrophilic and which have a long-chain hydrophobic hydrocarbon radical. In the films, these substances are oriented in such a way that the hydrophilic part is able to accumulate water at the surface of the film, resulting in a reduction in surface resistance which ultimately makes up the antistatic effect. Preferred antistatic agents are ethoxylated amines, N-($C_{12-18}$-alkyl)-N',N"-bis-(2-hydroxyethyl)-amines in particular combining safeness for use in the food industry with an antistatic effect.

Carboxylic acid amides are used as lubricants. Typical examples are erucic acid amide and oleic acid amide. Polymers from the group of polyalkyl siloxanes are also used.

Preferred antiblocking agents are silicon dioxide, silicates or polymers which are immiscible with the raw materials used for the surface layers (for example polycarbonate, polyamide, polymethyl methacrylate).

It was surprising to find that, for a given water vapor barrier effect, the quantity of hydrocarbon resin required in conjunction with highly isotactic polypropylene is considerably smaller than in the hydrocarbon resin/isotactic polypropylene system.

The films according to the invention may be produced by standard methods, such as lamination, coating or melt co-extrusion. After extrusion and solidification of the thick film on casting rollers, the film is longitudinally stretched in a ratio of 4:1 to 7:1 at a temperature of 120° C. to 150° C. The stretching ratio in the transverse direction is preferably from 8:1 to 12:1, the film being transversely stretched at a temperature in the range from 130° C. to 170° C. The subsequent heat-fixing step is preferably carried out at a temperature of 1° C. to 40° C. below the transverse stretching temperature. To guarantee the affinity of the substantially apolar film surface for printing inks, the film has to be subjected to a corona (spray) pretreatment. In this way, atmospheric oxygen is incorporated in the surface of the film in the form of carbonyl, epoxide, ether or alcohol groups. Other methods for the pretreatment of polypropylene films are flame pretreatment, plasma pretreatment and fluorine pretreatment.

EXAMPLE 1

A biaxially oriented film (surface stretching ratio 45:1; longitudinal stretching temperature 142° C.; transverse stretching temperature 160° C.) produced by the method described above had the following structure:

Total thickness: 25 μm

Surface Layers

Thickness: 1 μm

Material: Propylene/ethylene copolymer containing 3.5% ethylene, MFI: 5.0 g/10 mins., 0.25% $SiO_2$, mean particle size: 2.5 μm, 0.7% polydimethyl siloxane (viscosity: 106 cSt; DIN 53 019/25° C.)

Jacket Layers

Thickness: 1 μm

Material: Highly isotactic polypropylene; isotacticity: 97%.

Core Layer

Thickness: 21 μm

Material: 87% polypropylene, isotacticity: 97% 13% hydrocarbon resin master batch (based on polypropylene, resin content 50%), softening point: 140° C.; the hydrocarbon resin is a hydrogenated oligomeric cyclopentadiene resin.

EXAMPLE 2

A film was produced in the same way as in Example 1 except that the core layer of the film had a thickness of 26 μm (total thickness: 30 μm).

EXAMPLE 3

A film was produced in the same way as in Example 1, except that the film was free from hydrocarbon resin.

COMPARISON EXAMPLE 1

A film was produced in the same way as in Example 1, except that a polypropylene having an isotacticity of 94% was used both in the core layer and in the jacket layers. In addition, 30% of the hydrocarbon resin master batch of Example 1 was incorporated in the core layer.

COMPARISON EXAMPLE 2

A film was produced in the same way as in Comparison Example 1 except that the core layer had a thickness of 26 μm.

COMPARISON EXAMPLE 3

A film was produced in the same way as in Comparison Example 1, except that the film was free from hydrocarbon resin.

The following Table shows that, for a predetermined water vapor barrier effect, a film of the type according to the invention has considerable advantages in regard to the amount of hydrocarbon resin required.

|  | Wv. imp./g/$m^2$ d |
| --- | --- |
| Example 1 | 0.61 |
| Example 2 | 0.50 |
| Example 3 | 0.85 |
| Comparison Example 1 | 0.63 |
| Comparison Example 2 | 0.52 |
| Comparison Example 3 | 1.10 |

Measuring Methods

Determination of Impermeability to Water Vapor

Impermeability to water vapor was determined in accordance with DIN 53 122, Part 2, at 23° C./85% relative air humidity difference.

We claim:

1. A biaxially oriented, sealable polypropylene film having an improved water vapor barrier effect, having the following structure:

ABCBA where a) C is the base layer of highly isotactic polypropylene with an isotacticity of >94% and a hydrocarbon resin which has a molecular weight of up to about 2000 g/mol and a softening point above 130° C., b) the B's are two jacket layers of highly isotactic polypropylene (isotacticity >94%) free from hydrocarbon resin, the ratio between the thickness of the jacket layer and the thickness of the base layer being between 0.01 and 0.1, c) the A's are two surface layers of a heat-sealable polyolefin homopolymer, copolymer or terpolymer, these surface layers containing at least one antiblocking agent, a lubricant and an antistatic agent.

2. A sealable film as claimed in claim 1, wherein the base layer contains a hydrocarbon resin from the group of petroleum resins, terpene resins or coal tar resins.

3. A sealable film as claimed in claim 2, wherein the hydrocarbon resin is a hydrogenated oligomeric cyclopentadiene resin.

4. A sealable film as claimed in claim 1, wherein the surface layers consist essentially of a statistical propylene/ethylene copolymer a statistical propylene/1-butene copolymer a statistical propylene/ethylene/olefin terpolymer mixtures of two or three of the polymers mentioned above.

5. A sealable film as claimed in claim 1, wherein the surface layers contain silicon dioxide, calcium carbonate, polymethyl methacrylate, polycarbonate, silicone or HDPE (high-density polyethylene) as antiblocking agents.

6. A sealable film as claimed in claim 1, wherein the base layer, the surface layers, or both, contain a lubricant.

7. A film as claimed in claim 1, wherein the base layer, the surface layers, or both, contain an antistatic agent.

8. A film as claimed in claim 1, pretreated on one or both sides by corona, flame, plasma or fluorine pretreatment.

* * * * *